United States Patent [19]

Heiss et al.

[11] Patent Number: 5,062,107
[45] Date of Patent: Oct. 29, 1991

[54] SYNCHRONIZING CIRCUIT FOR REDUCING WAITING-TIME JITTER IN A DEMULTIPLEXER

[75] Inventors: Rainer Heiss, Korntal-Münchingen; Thomas Micke, Stuttgart, both of Fed. Rep. of Germany

[73] Assignee: Alcatel N.V., Netherlands

[21] Appl. No.: 452,212

[22] Filed: Dec. 18, 1989

[30] Foreign Application Priority Data

Dec. 19, 1988 [DE] Fed. Rep. of Germany ....... 3842694

[51] Int. Cl.$^5$ .............................................. H04J 3/06
[52] U.S. Cl. .................................. 370/105; 370/105.1
[58] Field of Search ............... 370/100.1, 105.1, 105.2, 370/105.3, 105.4, 106, 105; 375/114, 116

[56] References Cited

U.S. PATENT DOCUMENTS

| | | |
|---|---|---|
| 3,980,835 | 9/1976 | Mitchell et al. ................... 370/105.3 |
| 4,144,414 | 3/1979 | Nicholas . |
| 4,596,024 | 6/1986 | Thomson ............................ 370/106 |
| 4,746,920 | 5/1988 | Nellen et al. . |
| 4,803,726 | 2/1989 | Levine et al. ....................... 370/102 |

FOREIGN PATENT DOCUMENTS 2135855 9/1984 United Kingdom .

Primary Examiner—Douglas W. Olms
Assistant Examiner—Melvin Marcelo
Attorney, Agent, or Firm—Peter C. Van Der Sluys

[57] ABSTRACT

There are time-division multiplex communication systems in which digital signals which are asynchronous with the pulse frame and consist of successive blocks whose beginnings are marked with sync words are inserted into the pulse frame. The resulting jitter of the sync words ("waiting-time jitter") is reduced by a circuit which derives from the clock of the received sync words a sync signal (SY) that exhibits less jitter than the clock of the received sync words. According to the invention, the circuit contains a measuring device which measures the time intervals (N) between the sync words, a filter (F) which takes the average (N') of the time intervals (N), and a signal generator (S) which forms the sync signal (SY) from said average (N') in such a manner that the pulse period of the sync signal (SY) is equal to said average (N').

3 Claims, 3 Drawing Sheets

SYNCHRONIZING CIRCUIT FOR REDUCING WAITING-TIME JITTER IN A DEMULTIPLEXER

BACKGROUND OF THE INVENTION

1. Field of the Invention

The present invention relates to a demultiplexer for a digital time-division multiplex communication system wherein a digital signal which is asynchronous with the pulse frame and consists of successive blocks whose beginnings are marked with sync words is inserted into the pulse frame.

2. Description of the Prior Art

Such a synchronizing circuit contained in a demultiplexer is disclosed in DE-A1-34 39 633. In the demultiplexer described there, the sync signal is derived from the clock of the received sync words by correcting the word clock with the aid of additional information transmitted to the demultiplexer, such that the intervals between successive clock pulses are equal to the intervals between the sync words of the digital signal to be inserted into the pulse frame by the multiplexer at the transmitting end, which are asynchronous with the pulse frame. The jitter of the sync words caused by the asynchronous insertion of this signal, also referred to as "waiting-time jitter", is thus clearly reduced in the demultiplexer.

This solution has the disadvantage that a circuit for generating the additional information is required at the transmitting end, and that through the transmission of this additional information, the amount of useful information that can be transmitted is reduced.

SUMMARY OF THE INVENTION

It is, therefore, the object of the invention to provide a synchronizing circuit in a demultiplexer which reduces the waiting-time jitter without any steps having to be taken in the associated multiplexer at the transmitting end.

This object is attained by a demultiplexer comprising a circuit which derives from the clock of the received sync words a sync signal which exhibits less jitter than the clock of the received sync words, wherein the circuit contains a measuring device which measures the time intervals between the received sync words, a filter which takes the average of the time intervals between the sync words, and a signal generator which forms the sync signal from said average in such a manner that the pulse period of the sync signal is equal to said average. Further advantages of the invention are realized when the filter takes the average of the different time intervals between successive sync words successively over a predetermined period of time, and rounds it to an integer $N'$, the rounding error being taken into account for the subsequent averaging by error feedback. The filter can further include a counter in which an assumed main distance between sync words is stored before the circuit is put into operation, that the counter can increase or decrease its count by a fixed amount only once during the interval between two sync words, or leaves it unchanged, and that the change is determined by the result of a numerical comparison between the count of the counter and the sum of a subsequent count appearing at the input of the filter and an error signal.

DESCRIPTION OF THE DRAWINGS

The invention will now be explained by way of example with reference to the accompanying drawings, in which.

DETAILED DESCRIPTION OF THE PREFERRED EMBODIMENT

Figure 1:
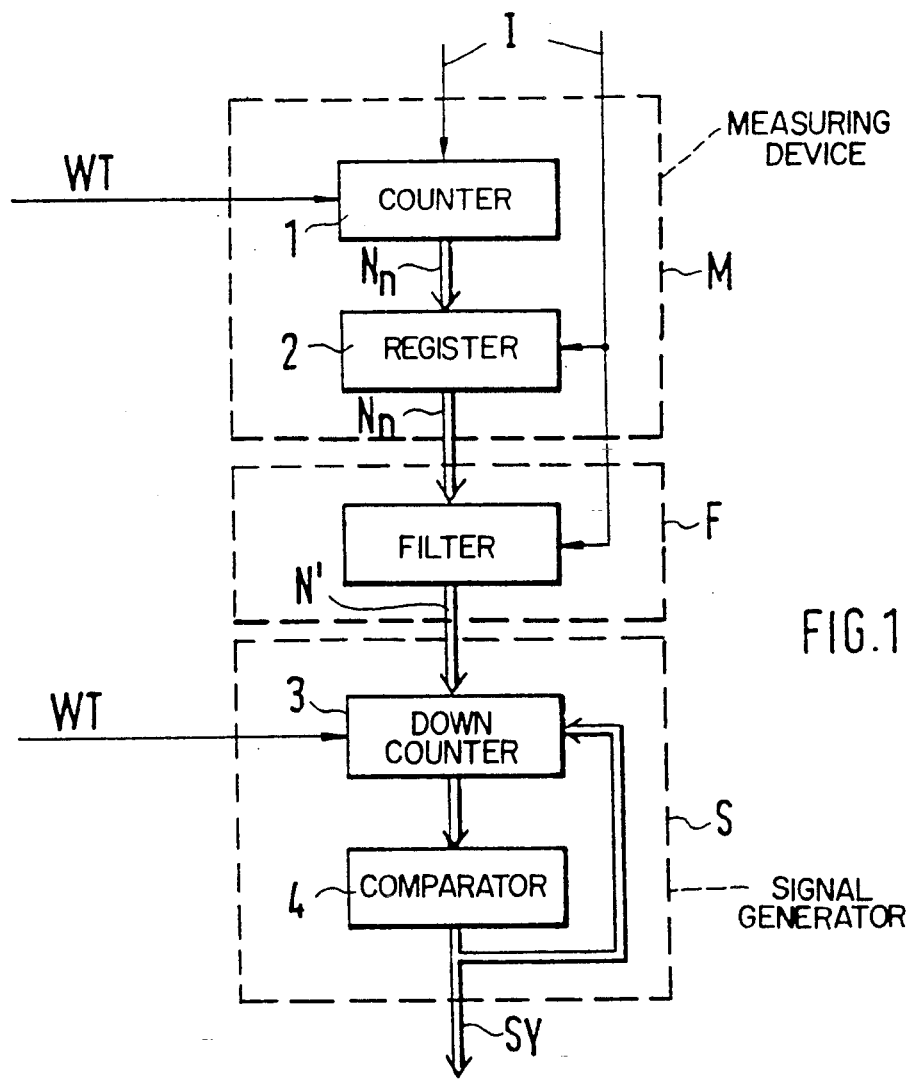
FIG. 1 is a block diagram of the novel circuit for reducing waiting-time jitter.

Referring to FIG. 1, when a sync word has been detected in a sync-word detector (not shown), a pulse I generated in the sync-word detector in response thereto is applied to a measuring device M over two leads.

The measuring device M contains a counter 1 and a register 2.

After receipt of a pulse I, the counter 1, clocked by a word clock WT provided by the demultiplexer (not shown), counts from zero until the next pulse I. It has then reached a count $N_n$, which is a measure of the time interval between these two pulses, i.e., between the two successive sync words just received. Different counts $N_i$ are possible, where $i = 0, 1, 2, \ldots, m, \ldots, n, \ldots$.

This count $N_n$ is transferred into the register 2, which is enabled by said next pulse I.

From the register 2, the count $N_n$ is transferred into a filter F, which is also controlled by the pulses.

The filter F takes the average $N'$, rounded to an integer, of the last received count and a predetermined number of previously received counts.

This average $N'$ is fed to a signal generator S consisting of a down counter 3 and a comparator 4. After receipt of the average $N'$, the down counter 3, clocked at the repetition rate of the word clock WT or an integral multiple thereof, counts from the average $N'$ down to zero. Each numerical value is fed to the comparator 4, which compares it with the numerical value zero. When zero has been reached, the comparator produces a sync signal SY, to be exact: the edge of a sync signal SY, whose pulse period is equal to the average $N'$. The sync signal SY serves as the input signal for a phase-locked loop (PLL). It is fed back to the down counter 3, so that the latter can receive the next average $N'$ from the filter F.

Figure 2:
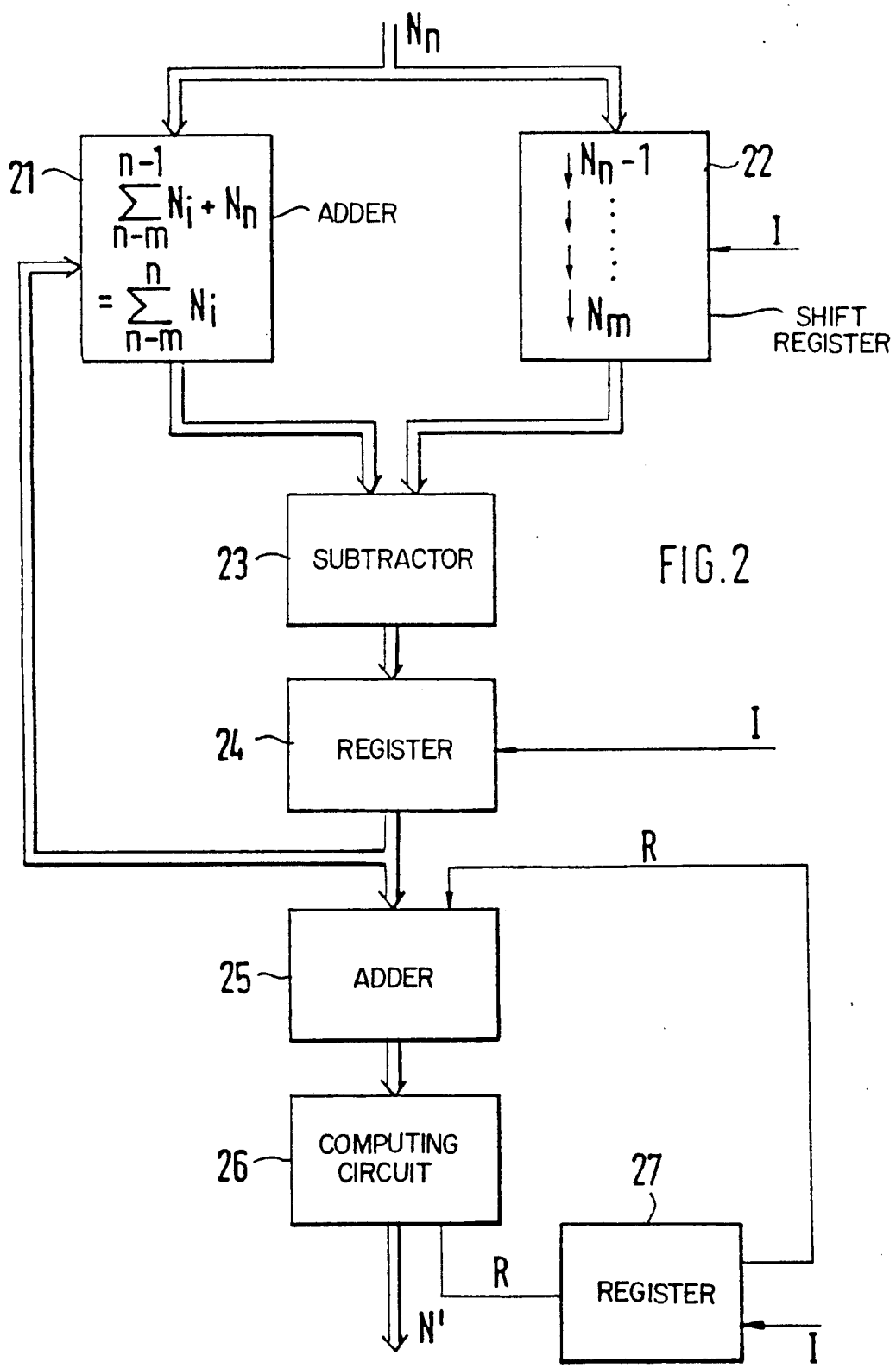
FIG. 2 shows a first embodiment of the filter F of FIG. 1.

FIG. 2 shows a first embodiment of the filter F of FIG. 1.

A count $N_n$ is fed both to an adder 21, where it is added to the sum of the last m counts up to $N_{n-1}$ received from the register 2, i.e., $$\sum_{i=n-m}^{n-1} N_i + N_n = \sum_{i=n-m}^{n} N_i,$$

and to a shift register 22 containing the last m counts $N_{n-m}$ to $N_{n-1}$.

Each time a pulse I is applied to the shift register 22, the counts $N_i$ are shifted by one cell, the new count $N_n$ is inserted into the cleared cell of the count $N_{n-1}$, and the "oldest" count $N_{n-m}$ is applied to a subtracter 23.

The latter has two inputs, which are connected to the output of the shift register 22 and to the output of the adder 21, respectively. It forms the difference between the sum $$\sum_{i=n-m}^{n-1} N_i + N_n = \sum_{i=n-m}^{n} N_i$$

from the output of the adder 21 and the count $N_{n-m}$ from the shift register 22:

$$\sum_{i=n-m}^{n} N_i - N_{n-m} = \sum_{i=n-m+1}^{n} N_i$$

The difference formed by the subtracter 23 is coupled into a register 24, which is also clocked by the pulses I. From this register, it is transferred, on the one hand, to an additional adder 25 and, on the other hand, back to the adder 21 to form the new sum $$\sum_{i=n-m+1}^{n+1} N_i$$

The adder 25 forms the sum of the difference and a rounding error R. The sum is coupled into a computing circuit 26 with two outputs, which takes the average of the counts $N_i$ and rounds it to an integer N', transfers the latter to the signal generator S (see FIG. 1), and feeds the rounding error R to a register 27, which is clocked by the pulses I and feeds the error that results from the previous round-off to the adder 25 simultaneously with the arrival of a new sum.

The rounding errors R are used to maintain the clock rate constant on an average.

Figure 3:
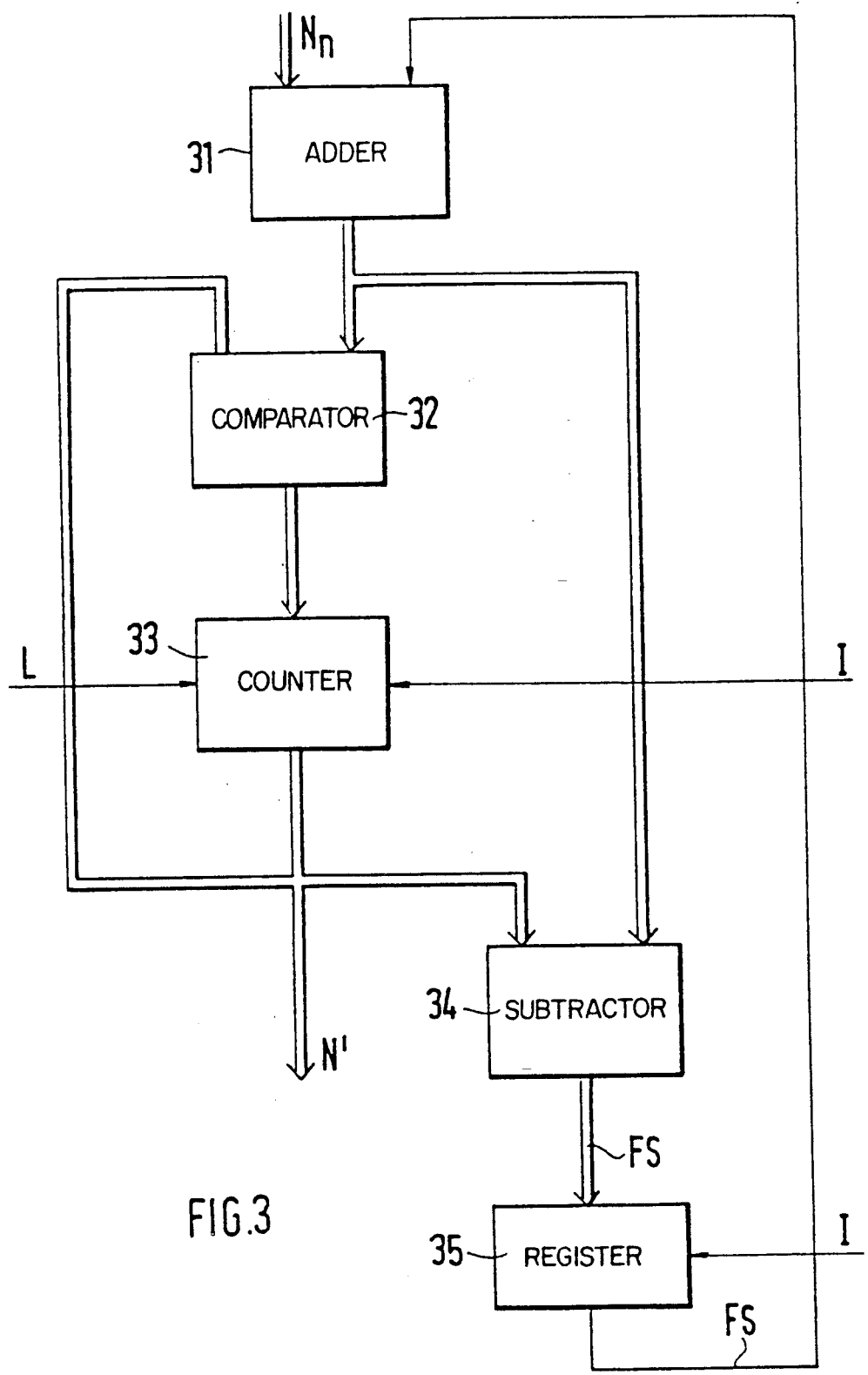
FIG. 3 shows a second embodiment of the filter F of FIG. 1.

A further embodiment of the filter F is shown in FIG. 3.

It includes an adder 31 at the input end which forms the sum of the respective last count $N_n$ from the register 2 (FIG. 1) and an error signal FS from a register 35.

This sum is fed to one input of a two-input comparator 32 and to a subtracter 34. The other input of the comparator 32 is fed with the count from the output of a counter 33. If the value from the adder 31 is less than the count of the counter 33, the comparator 32 will decrease the count of the latter by 1; if, conversely, the value from the adder 31 is greater than the count of the counter 33. If the two values are equal, the comparator 32 will leave the count unchanged. Before the circuit is put into operation, the counter 33 is set to an assumed average count via a line L.

The counter 33 is clocked by the pulses I. Its output is connected to the input of the signal generator S of FIG. 1 and to the subtracter 34.

The subtracter 34 forms the difference between the count of the counter 33 and the sum received from the adder 31. This difference represents the error signal FS, which is applied to the register 35, which is clocked by the pulses I and feeds the error signal FS to the adder 31 upon arrival of the next count $N_{n+1}$ at the input of this adder. The latter then forms the sum of the count $N_{n+1}$ and the error signal FS again.

In this manner, an average count N' can be set in the counter 33. The counts delivered by the counter to the signal generator S thus vary much less than the counts presented to the adder 31.

What is claimed is:

1. A synchronizing circuit for a demultiplexer for a digital time-division multiplex communication system wherein a digital signal which is asynchronous with the pulse frame and consists of successive blocks whose beginnings are marked with sync words is inserted into the pulse frame, said circuit deriving from a clock signal of the received sync words a sync signal (SY) which exhibits less jitter than the clock signal of the received sync words, characterized in that the circuit contains a measuring device (M) which measures the time intervals (N) between the received sync words, a filter (F) which takes the average (N') of the time intervals (N) between sync words, and a signal generator (S) which forms the sync signal (SY) from said average (N') in such a manner that the pulse period of the sync signal (SY) is equal to said average (N').

2. A synchronizing circuit as claimed in claim 1, characterized in that the filter (F) takes the average (N') of the different time intervals ($N_i$) between successive sync words successively over a predetermined period of time, and rounds it to an integer N', the rounding error (R) being taken into account for the subsequent averaging by error feedback.

3. A synchronizing circuit as claimed in claim 1, characterized in
that the filter (F) includes a counter (33) in which an assumed mean distance between sync words is stored before the circuit is put into operation, that the counter (33) can increase or decrease its count (N') by a fixed amount only once during an interval between two sync words or leaves it unchanged, and that the change is determined by the result of a numerical comparison between the count (N') of the counter (33) and the sum of a subsequent count ($N_{n+1}$) appearing at the input of the filter (F) and an error signal (FS).

* * * * *